Sept. 6, 1932.　　V. H. HARBERT　　1,875,922
FLOOR RACK CONNECTING MEANS
Filed Jan. 6, 1930　　2 Sheets-Sheet 1
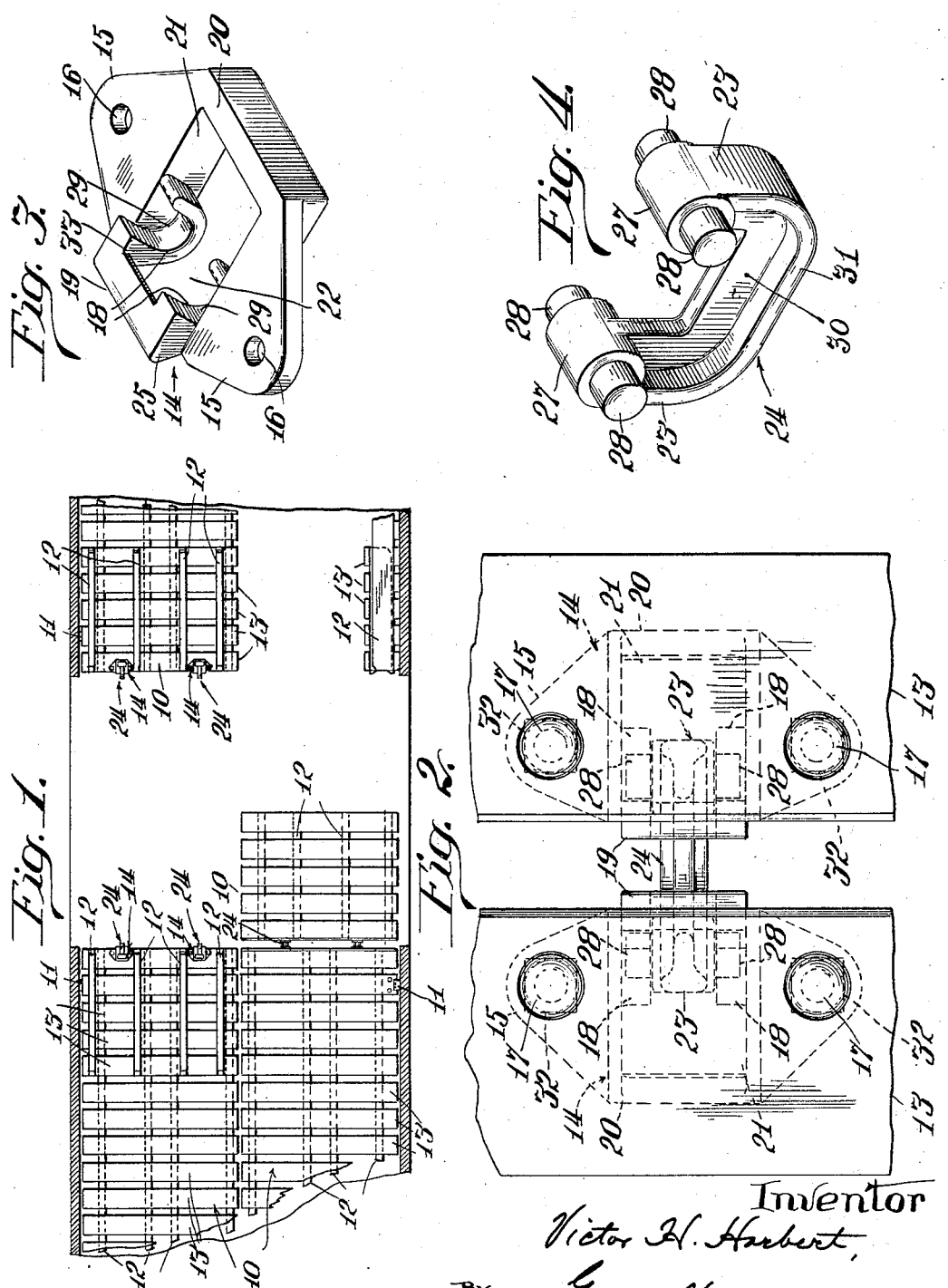
Inventor
Victor H. Harbert,
By George Heidman
Attorney.

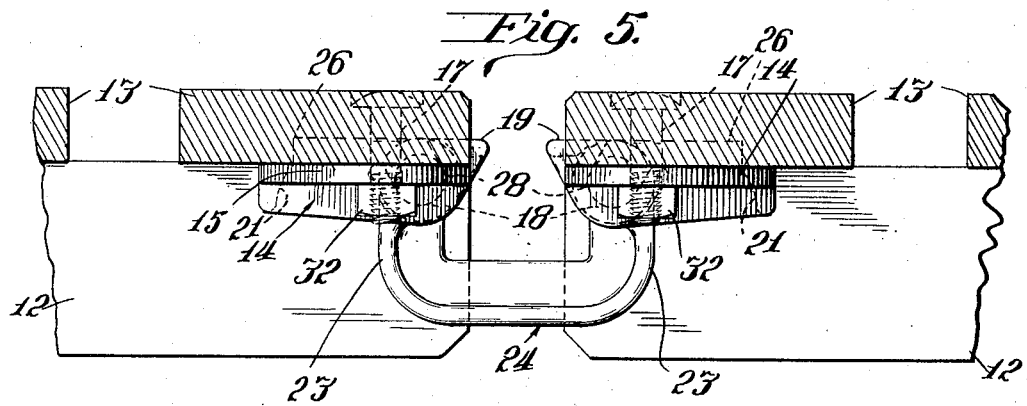
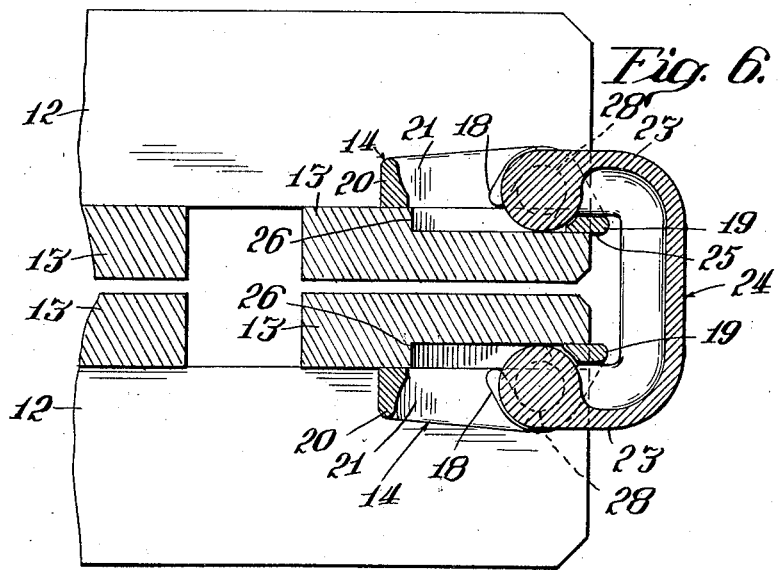
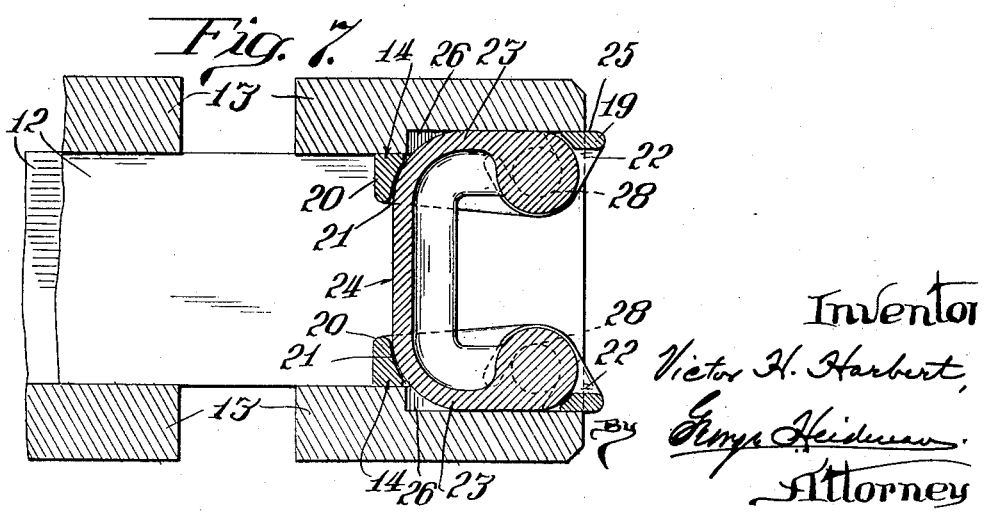

Patented Sept. 6, 1932

1,875,922

UNITED STATES PATENT OFFICE

VICTOR H. HARBERT, OF CHICAGO, ILLINOIS, ASSIGNOR, BY MESNE ASSIGNMENTS, TO ILLINOIS RAILWAY EQUIPMENT COMPANY, A CORPORATION OF ILLINOIS

FLOOR RACK CONNECTING MEANS

Application filed January 6, 1930. Serial No. 418,732.

My invention relates to means whereby the floor racks or superposed floor sections, employed in railroad freight cars for the shipment of commodities requiring proper ventilation or air circulation intermediate of the main floors and the racks, are hingedly connected together.

The floor racks, as employed in railroad freight cars, are usually made in suitable sections arranged lengthwise of the car and on each side of the longitudinal center thereof so as to permit the racks to be easily handled and also to enable them to be raised out of operative position when desired.

My invention relates more particularly to means for connecting the door sections of the floor rack to the other or main sections thereof in order that the door sections may be readily folded onto the main sections and therefore away from the door openings in order that trucking through the car may be carried on; the means being of such nature that the door sections of the floor rack may be folded into face-to-face relation with the main sections when the latter are in lowered position on the floor of the car and also to permit a back-to-back fold of the sections when the main portion of the floor rack has been raised or folded upwardly against the inner side wall of the car.

The objects and advantages of my invention will be readily comprehended from the following detailed description of the drawings, wherein—

Figure 1 is a sectional plan of the interior of a portion of a car provided with floor-rack sections connected together with my improved means; certain of the sections being shown folded into face-to-face relation; certain other sections being folded into back-to-back relation; while another door section is in lowered or operative position.

Figure 2 is a plan view of portions of two sections provided with my improved connecting means secured to the lower sides thereof.

Figure 3 is a perspective view of one of the attaching portions of my improved means.

Figure 4 is a perspective view of the connecting member or link portion of said means.

Figure 5 is a side elevation of a portion of two floor rack sections with the slats shown in section and my improved means secured thereto.

Figure 6 is a longitudinal sectional view through my improved connecting means shown attached to portions of two floor rack sections arranged in face-to-face relation.

Figure 7 is a similar view showing the portions of the two floor rack sections in back-to-back folded relation.

While my improved means may be used in any refrigerator car or ordinary freight car employing a supplemental floor or floor racks, the invention is especially adapted for use in connection with floor racks made in sections so that the floor rack sections at the side door openings of the car may be folded out of way when occasion requires.

For purposes of exemplification I illustrate my invention as applied to floor racks wherein certain of the sections, namely the sections indicated at 10 in Figure 1, are hingedly secured to the floor proper of the car adjacent to the side wall or to the side wall, as indicated at 11, so as to permit the rack to be folded up parallel with the car side wall when the car is used for ordinary lading or when the main floor of the car is to be cleaned.

Freight cars, when employed, for instance for the shipment of bananas, must be provided with suitable floor racks so as not only to provide suitable air circulation therebeneath, but also must be provided with floor racks having slats spaced a predetermined distance apart to permit the bananas, usually shipped in large clusters, to be packed with the butt ends of the stem of each cluster resting on the floor racks and therefore it is essential that the openings between the slats and also between the connected sections be not greater than certain predetermined dimensions which are generally specified by the railroads so as to prevent the stems from entering between the slats or between the connected sections to an extent which would allow the heavy clusters of bananas to rest on the racks, a condition which would result in damage to the bananas. It is, therefore, important that the spacing between the floor rack sections, when superposed on the main floor, be maintained within the prescribed dimensions. It is also essential that connecting means be provided which will permit easy manipulation of the comparatively heavy sections; which will allow a compact folding thereof when required and at the same time without lateral play or shifting which would tend to cause a binding condition and interfere with the proper operation.

The floor rack sections each consist of a suitable number of sleepers or stringers 12 of length in keeping with the desired length of the respective sections and arranged in parallel spaced relation lengthwise of the car floor and these sleepers or stringers are provided with planks or slats 13.

These are arranged in predetermined spaced relation parallel with each other transversely of the sleepers or stringers to which they are suitably secured. The floor rack sections, intermediate of the door openings and intermediate of the door openings and the ends of the car, are usually hingedly connected by means of a well known type of hinge to the floor proper or to the side wall of the car so as to permit the sections to swing upwardly against the side wall, as indicated in the lower right hand corner of Figure 1, where one of the floor rack sections is folded into back-to-back relation with the other section which is hingedly secured to the car.

In order to secure all of the sections against displacement and loss, it is essential that the door opening sections be hingedly secured to the respective adjacent sections of the main portions of the floor rack in a manner which will permit the door sections to be readily swung out of place in order to permit loading of the car as well as to permit trucking through the car for the loading of a "spotted" freight car located on a track removed from the loading platform and arranged substantially parallel with the car provided with the floor rack sections. It is apparent that during such loading operations, the floor rack sections at the door openings must be moved out of place in order to provide a suitable passage for the hand truck and also to prevent injury to the floor rack sections.

During such operations, if the main floor rack sections are in lowered position on the car floor, it is then customary to swing the door sections over onto the main floor rack sections in face-to-face relation as shown in the upper part of Figure 1 where the two door sections are swung onto the respective adjacent sections of the floor rack. In order to permit the back-to-back fold of the sections, the stringers of the adjacent sections are arranged in slight staggered relation so that the stringers of the two sections may extend parallel with each other in the manner shown in Figure 1 and Figure 7; the staggered relation of the stringers being clearly shown in Figure 1.

My improved connecting means comprises a pair of socketed attaching members 14, as shown in Figure 3, and are intended to be secured to the lower sides of the end slats 13 of the adjacent sections.

The attaching elements 14 are preferably in the nature of box-like castings or skeleton plates, as shown in Figure 3, provided at opposite sides with extensions or lobes 15, 15 which are apertured at 16 to receive suitable fastening means or bolts 17 whereby the attaching elements are secured to the under faces of the slats 13 with the heads of the bolts preferably countersunk in the upper face of the slats, as shown in Figure 5.

The attaching elements 14, as shown in Figure 3, on the interior thereof, are each provided with the socket providing ribs 18, 18 on the opposite inner sides of the casting. The ribs 18 extend from one end wall 19 of the casting and terminate at a distance removed from the opposite end wall 20 so as to leave an unobstructed opening 21 through the attaching member. As shown in Figure 3, the two ribs 18 are arranged in spaced relation with each other so as to leave a narrow passage or opening 22 therebetween for the passage of an end or arm 23 of the connecting element or link 24 shown in Figure 4.

In order to permit a proper face-to-face folding of the floor rack sections, with a connecting member or link of size or length designed to maintain the required spacing between the respective sections, the end wall 19 of the attaching element 14 is shown to extend upwardly beyond the main face of the attaching element to an extent as shown at 25 in Figure 3, in order that the passage 22 at its outer end may extend above the plane of the slat engaging face of the attaching element 14 and thus provide sufficient clearance for the end 23 of the connecting element or link 24 when the sections are folded face-to-face, as shown in Figure 6. In order to permit the attaching elements 14 to be properly secured to the lower sides of the end slats 13 of adjacent floor rack sections, these slats are cut away or socketed, as shown at 26 in Figure 6, to an extent sufficient to receive the upwardly protruding end wall 19, and thus permit the main face of the attaching element to extend flush with the lower side of the slats, as shown.

The connecting members 24 are in the nature of substantially U-shape members whose ends terminate in the enlarged cylindrical or rounded heads 27, 27 provided on opposite sides with trunnions 28, 28. The enlarged cylindrical portions or rounded heads 27 at the ends of the link member 24 are of transverse dimensions substantially equal to the spacing 22 between the ribs 18 of element 14; while the trunnions 28 are adapted to rotatably seat in the sockets 29 formed by the arcuate ribs 18. The intermediate portion 30 of the link or connecting member is of a length which will maintain the required spacing between adjacent floor rack sections when the trunnions 28 are seated in their respective sockets 29 of attaching members 14. In order to provide sufficient strength and rigidity, I have shown the connecting member or link 24 provided with a reenforcing rib 31 disposed throughout its length.

After the end slats 13 of the two adjacent floor rack sections have been cut-away or socketed on their lower faces, as shown at 26 in Figure 6, the attaching member 14, with one end of the connecting member or link 24 arranged in the sockets 29, is then secured to the lower face of the end slat with the upper face of the member 14 shown in Figure 3 arranged against the slat in the manner shown in Figure 5; the attaching of the member being accomplished by bolts, as shown at 17 in Figure 5, whose heads are preferably countersunk in the slat.

The connecting plate or member 14 is held in place by the nuts 32 on the ends of the bolts 17. The cut-away portion 26 in the slats is just sufficient to accommodate the raised end wall 19 of the member 14 and therefore just sufficient also to permit free rotative movement of the enlarged head portion 27 of the link member 24. As the inner end of the arcuate or socket-forming ribs 18 terminate substantially flush with the upper slat engaging face of the connecting member 14, it is apparent that the ends of the connecting link will be held in their sockets against displacement. On the other hand, in the event of breakage or necessity for renewing any of the elements of the connecting means this may be readily accomplished by removing the holding bolts 17, thus allowing the connecting member or plate 14 to be dropped down until the inner ends of the ribs 18 clear the trunnions 28 and allow the plate to be positioned where the trunnioned heads or ends of the connecting link may pass through the large opening 21 in the attaching plate 14. The raised or enlarged end wall 19 is cut away or socketed at 33, Figure 3, to receive the enlarged cylindrical head portion 27 of the link member when the trunnions 28 are completely seated in the bottom of the sockets 29 of the ribs 18. The enlarged heads 27 and the socket 33 of the end wall 19 will prevent lateral play in the connecting means.

I have shown what is believed to be the best embodiment and adaptation of my invention which has been described in terms employed merely as terms of description and not as terms of limitation, as structural modifications may be made without, however, departing from the spirit of my invention.

What I claim is:

1. Floor rack connecting means comprising a pair of socketed plates adapted to be secured to the lower faces of the end slats of two aligned floor rack sections, two opposite sides of the sockets in the plates being provided with arcuate ribs; and a connecting member whose opposite ends are provided with laterally disposed portions adapted to rotatably seat on said arcuate ribs so as to permit vertical swinging movement of the member relative to said plates.

2. Floor rack connecting means comprising a pair of box-like plates having an opening therethrough, said plates on their opposite inner walls being provided with sockets; and a single piece connecting link whose ends are adapted to fit into the box-like plates, the ends of the link being provided with laterally extending trunnions adapted to rotatably seat in said sockets.

3. Floor rack connecting means comprising a pair of plates having enlarged openings therethrough, the plates at opposite sides of the openings being provided with sockets open at the upper sides of the plates and removed from the end walls of the enlarged openings; and a connecting link having upturned ends terminating in laterally disposed trunnions adapted to pass upwardly through the enlarged openings and to seat in said sockets.

4. Floor rack connecting means comprising a pair of plates having enlarged openings therethrough, one wall at the end of the opening in each plate being disposed above the top face of the plate, said wall being slotted on its lower side in alignment and connecting with the enlarged openings, two opposite side walls of the opening being provided with arcuate ribs extending from said last mentioned slotted end wall and terminating at a distance removed from the other end wall to provide sockets open at the upper face of each plate; and a substantially U-shaped link whose ends are provided with laterally disposed trunnions adapted to rotatably seat in said sockets.

5. Floor rack connecting means comprising a pair of plates having enlarged openings therethrough, said openings being of reduced width at one of the ends, the inner side walls at the reduced ends of the openings being formed with sockets; and U-shaped links having enlarged ends seatable in said sockets while the up-turned ends of the links are disposed through the reduced ends of the openings in said plates.

6. Floor rack connecting means comprising, in combination with a pair of aligned floor-rack sections; a pair of attaching members; and a single piece member the opposite ends whereof have pivoted relation with said attaching members, while the intermediate portion of said single piece member is disposed toward one side of the pivoted axes of the ends.

7. Floor rack section connecting means comprising, in combination with a pair of aligned floor-rack sections, a pair of attaching plates adapted to be secured to the slats of two aligned sections, said plates being provided with sockets; and a connecting member having a non-flexing intermediate portion and two end portions disposed toward the same side of the longitudinal axis of the intermediate portion; said end portions being laterally extended to seat in said sockets.

8. Floor rack connecting means comprising a non-flexing single piece member whose ends are disposed beyond one longitudinal side of the member, said ends being of equal length and terminating in laterally disposed portions; and socket providing means for receiving the laterally disposed portions to provide pivotal connection between the means and said member; said means being adapted to be connected to the slats of the aligned floor-rack sections.

9. Floor rack connecting means comprising a non-flexing single piece member whose ends are disposed beyond one longitudinal side of the member, said ends being of equal length and terminating in lateral portions extending from opposite sides of the ends; and a pair of plates adapted to be secured to the slats of two aligned floor-rack sections, said plates having sockets of equal dimensions adapted to receive said lateral portions of the member.

10. Floor rack connecting means comprising a non-flexing single piece member whose ends are disposed beyond one longitudinal side of the member, said ends being of equal length and terminating in lateral portions extending from opposite sides of the ends; and a pair of plates adapted to be secured to the lower faces of the slats of two aligned floor-rack sections, said plates having sockets of equal dimensions, open at top and adapted to receive said lateral portions of the member.

11. Connecting means of the character described comprising a pair of members provided with enlarged recesses therein and adapted to be secured to the adjacent ends of two aligned elements to be hingedly connected together, each member on opposite side walls of said recesses having sockets open on the sides disposed toward each other and open toward the rear attaching side of the member; and a U-shaped connecting element provided at opposite ends with laterally extended trunnions adapted to extend through the opposing open sides of the sockets, said trunnions being adapted to enter the sockets through the rear open sides thereof before the members are secured in place.

12. Connecting means of the character described comprising a pair of members provided with enlarged recesses therein and adapted to be secured to the adjacent ends of two aligned elements to be hingedly connected together, each member on opposite sides of said recesses and at one of the ends thereof having sockets; and a U-shaped link provided at opposite ends with laterally extended trunnions adapted to rotatably seat in said sockets; said members at the ends of the recesses having the sockets being provided with transversely disposed portions whereby the trunnions are held in said sockets.

VICTOR H. HARBERT.